United States Patent
Zhu et al.

(10) Patent No.: US 10,915,194 B2
(45) Date of Patent: Feb. 9, 2021

(54) TOUCH DISPLAY PANEL AND TOUCH DISPLAY DEVICE

(71) Applicant: KunShan Go-Visionox Opto-Electronics Co., Ltd., Jiangsu (CN)

(72) Inventors: Shengzu Zhu, Jiangsu (CN); Weiguo Li, Jiangsu (CN); Zhihua Zhang, Jiangsu (CN)

(73) Assignee: KUNSHAN GO-VISIONOX OPTO-ELECTRONICS CO., LTD., Jiangsu (CN)

( * ) Notice: Subject to any disclaimer, the term of this patent is extended or adjusted under 35 U.S.C. 154(b) by 0 days.

(21) Appl. No.: 16/582,138

(22) Filed: Sep. 25, 2019

(65) Prior Publication Data

US 2020/0019268 A1   Jan. 16, 2020

Related U.S. Application Data

(63) Continuation of application No. PCT/CN2018/097347, filed on Jul. 27, 2018.

(30) Foreign Application Priority Data

Dec. 29, 2017   (CN) .................... 2017 2 1923852 U

(51) Int. Cl.
  *G06F 3/041*   (2006.01)
  *G06F 3/044*   (2006.01)
  (Continued)

(52) U.S. Cl.
  CPC ............ *G06F 3/0412* (2013.01); *G06F 3/044* (2013.01); *G06F 3/047* (2013.01); *G06K 9/00006* (2013.01)

(58) Field of Classification Search
  CPC ........ G06F 3/0412; G06F 3/044; G06F 3/047; G06K 9/00006
  See application file for complete search history.

(56) References Cited

U.S. PATENT DOCUMENTS

| 4,841,290 A | * | 6/1989 | Nakano | ................. G06F 3/0412 345/179 |
| 2012/0105081 A1 | * | 5/2012 | Shaikh | .................... G06F 3/044 324/686 |

(Continued)

FOREIGN PATENT DOCUMENTS

| CN | 104049828 A | 9/2014 |
| CN | 105159506 A | 12/2015 |

(Continued)

OTHER PUBLICATIONS

International Search Report and English Translation in International Application No. PCT/CN2018/097347.

(Continued)

*Primary Examiner* — Ariel A Balaoing
(74) *Attorney, Agent, or Firm* — Ladas &. Parry LLP

(57) ABSTRACT

A touch display panel is provided. The touch display panel includes a touch film layer and a fingerprint identification film layer. An orthographic projection of the fingerprint identification film layer on the touch film layer is located in a preset hollow region of the touch film layer. Two ends of at least one specific electrode in touch film layer are connected to a first driver chip via a signal transmission line, and the specific electrode includes a touch drive electrode and/or a touch inductive electrode, cut off by a preset hollow region.

8 Claims, 4 Drawing Sheets

(51) Int. Cl.
*G06F 3/047* (2006.01)
*G06K 9/00* (2006.01)

(56) References Cited

U.S. PATENT DOCUMENTS

| | | | | |
|---|---|---|---|---|
| 2013/0015906 A1* | 1/2013 | Yeh | ............ | G06F 3/044 |
| | | | | 327/517 |
| 2016/0054844 A1* | 2/2016 | Lin | ............ | G06F 3/0416 |
| | | | | 345/173 |
| 2016/0253540 A1* | 9/2016 | Han | ............ | G06K 9/0002 |
| | | | | 382/124 |
| 2016/0350570 A1* | 12/2016 | Han | ............ | G06K 9/0002 |
| 2016/0364593 A1* | 12/2016 | Lee | ............ | G06F 3/0416 |
| 2017/0336910 A1 | 11/2017 | Han et al. | | |
| 2019/0018540 A1* | 1/2019 | Ko | ............ | G06F 3/0412 |

FOREIGN PATENT DOCUMENTS

| | | |
|---|---|---|
| CN | 107346195 A | 11/2017 |
| CN | 108052229 A | 5/2018 |

OTHER PUBLICATIONS

Written Opinion in International Application No. PCT/CN2018/097347.
CN 108052229 A—Espacenet English Abstract.
CN 107346195 A—Espacenet English Abstract.
CN 105159506 A—Espacenet English Abstract.
CN 104049828 A—Espacenet English Abstract.

* cited by examiner

TOUCH DISPLAY PANEL AND TOUCH DISPLAY DEVICE

CROSS-REFERENCE TO RELATED APPLICATION

This application is a continuation of International Application No. PCT/CN2018/097347, filed on Jul. 27, 2018, which is based upon and claims priority to Chinese Patent Application No. 201721923852.3, filed on Dec. 29, 2017, with a title "touch display panel and touch display device", the entire contents of which are hereby incorporated by reference.

FIELD

The application relates to a field of display technology, and particularly, to a touch display panel and a touch display device.

BACKGROUND

With the development of touch technology and display technology, touch display devices have been increasingly sought after by people. The touch display devices not only may save space, be convenient to carry, but also may allow direct operation by users using their fingers or stylus, leading to a comfortable and very convenient usage. At present, touch display devices have been applied in various technical fields, such as personal digital processing (PDA), touch intelligent mobile terminals (such as mobile phones), portable notebook computers in the market, and the like.

Taking touch intelligent mobile terminals as an example, with a rapid development of intelligent mobile terminals, intelligent mobile terminals with ultra-high screen-to-body ratio are getting highly thought by more and more manufacturers and consumers by virtue of their ability to bring the ultimate visual experience to users. However, as the screen-to-body ratio of the intelligent mobile terminals is increasing, a space of a fingerprint identification module located at the underside of the display screen of the intelligent mobile terminal and reserved for a user to conduct security authentication, becomes smaller and smaller. In this case, in order to provide a more convenient user experience for a user, some manufacturers consider directly arranging the fingerprint identification module in the touch display area of the intelligent mobile terminal, so that the user may simultaneously perform a touch operation and a finger identification operation in the touch display area.

In the above scenario, when the capacitive fingerprint identification module is directly arranged in the capacitive touch display area, the two interfere with each other in the overlapping area thereof, so that an area in a relatively lower layer is shielded from signal by an area in a relatively upper layer in the overlapping area, which in turn causes a failure problem of the area in the relatively lower layer in the overlapping area.

SUMMARY

Embodiments of the application provide a touch display panel to solve an interference problem in an overlapping region caused by a capacitive fingerprint identification module directly arranged in a capacitive touch display area.

In order to solve the above technical problem, the following technical solutions are adopted in the embodiments of the application:

A touch display panel, includes a touch film layer and a fingerprint identification film layer, an orthographic projection of the fingerprint identification film layer on the touch film layer being located in a preset hollow region of the touch film layer. The touch film layer includes a touch drive electrode arranged along a first direction, and a touch inductive electrode arranged along a second direction, wherein the touch drive electrode and the touch inductive electrode are cross-insulated. Two ends of at least one specific electrode in the touch film layers are connected to a first driver chip via a signal transmission line, and the specific electrode including a touch drive electrode and/or a touch inductive electrode, cut off by a preset hollow region.

Preferably, when the specific electrode includes the touch drive electrode and the touch inductive electrode, two ends of at least one specific electrode in touch film layers being connected to the first driver chip via a signal transmission line includes: two ends of a first specific electrode in touch film layers are connected to the first driving chip via a first signal transmission line, and the first specific electrode is a touch inductive electrode which is cut off by the preset hollow region.

Two ends of a second specific electrode in touch film layers are connected to the first driving chip via a second signal transmission line, and the second specific electrode is a touch inductive electrode, cut off by the preset hollow region.

Preferably, the fingerprint identification film layer includes a fingerprint drive electrode arranged along a third direction, and a fingerprint inductive electrode arranged along a fourth direction, the fingerprint drive electrode and the fingerprint inductive electrode are cross-insulated; and the fingerprint drive electrode is connected to a second driver chip via a third signal transmission line, and the fingerprint inductive electrode is connected to the second driver chip via a fourth signal transmission line.

Preferably, the first direction is the same as the third direction, and the second direction is the same as the fourth direction.

Preferably, the touch display panel further includes a display film layer, wherein a plurality of illuminating sub-pixels are arranged in an array in the display film layer; orthographic projections of both the fingerprint drive electrode and the fingerprint inductive electrode of the fingerprint identification film layer on the touch film layer do not overlap with an orthographic projection of the illuminating sub-pixels of the display film layer on the touch film layer.

Preferably, the third signal transmission line and the fourth signal transmission line are located at a gap of adjacent illuminating sub-pixels of the display film layer.

Preferably, two ends of the touch drive electrode, except the first specific electrode, in the touch film layer are connected to the first driver chip via the first signal transmission line; two ends of the touch inductive electrode, except the second specific electrode, in the touch film layer are connected to the first driver chip via the second signal transmission line.

Preferably, a material of the fingerprint identification film layer is a transparent conductive material or a metal material with a width of less than 5 micrometers.

Embodiments of the application further provide a touch display device to solve an interference problem in an overlapping region caused by a capacitive fingerprint identification module directly arranged in a capacitive touch display area.

The following technical solutions are adopted in the embodiments of the application: a touch display device includes the above touch display panel.

The following advantageous effects may be achieved by at least one of the above technical solutions adopted by the embodiment of the application:

In the touch display panel provided by the application, since the preset hollow region is arranged in the touch film layer, and the orthographic projection of the fingerprint identification film layer on the touch film layer is located in the preset hollow region of the touch film layer, thus there is no interference between these two film layers. Furthermore, two ends of at least one specific electrode in the touch film layer are connected to the first driver chip via a signal transmission line, and the at least one specific electrode includes the touch drive electrode and/or the touch inductive electrode, cut off by the preset hollow region, thereby preventing the touch drive electrode and the touch inductive electrode which are cut off by the preset hollow region from cutting off the connection to the first driver chip

DETAILED DESCRIPTION

The technical solution provided by the embodiments of the application is described in detail below in conjunction with the accompanying drawings.

The application provides a touch display panel, including a touch film layer and a fingerprint identification film layer. An orthographic projection of the fingerprint identification film layer on the touch film layer is located in a preset hollow region of the touch film layer. The touch film layer includes a touch drive electrode arranged along a first direction, and a touch inductive electrode arranged along a second direction, wherein the touch drive electrode and the touch inductive electrode are cross-insulated; and two ends of at least one specific electrode in the touch film layer are connected to a first driver chip via a signal transmission line, and the at least one specific electrode includes a touch drive electrode and/or a touch inductive electrode, cut off by a preset hollow region.

In the touch display panel provided by the application, since a preset hollow region is arranged in the touch film layer, and a orthographic projection of the fingerprint identification film layer on the touch film layer is located in a preset hollow region of the touch film layer, thus there is no interference between the two film layers. Furthermore, two ends of at least one specific electrode in the touch film layer are connected to a first driver chip via a signal transmission line, and the at least one specific electrode includes a touch drive electrode and/or the touch inductive electrode, cut off by the preset hollow region, thereby preventing the touch drive electrode and the touch inductive electrode, cut off by the preset hollow region, from cutting off the connection to the first driver chip.

The preset hollow region described in the application may be set in the touch film layer according to a size of the fingerprint identification film layer, and a shape of the preset hollow region may be determined according to actual use, which is not limited in the application, as long as the preset hollow region enables the fingerprint identification film layer to be arranged therein.

A core concept of the touch display panel provided by the application is briefly described based on the above contents, and the concept of the application will be described in detail below through specific embodiments.

Figure 1:
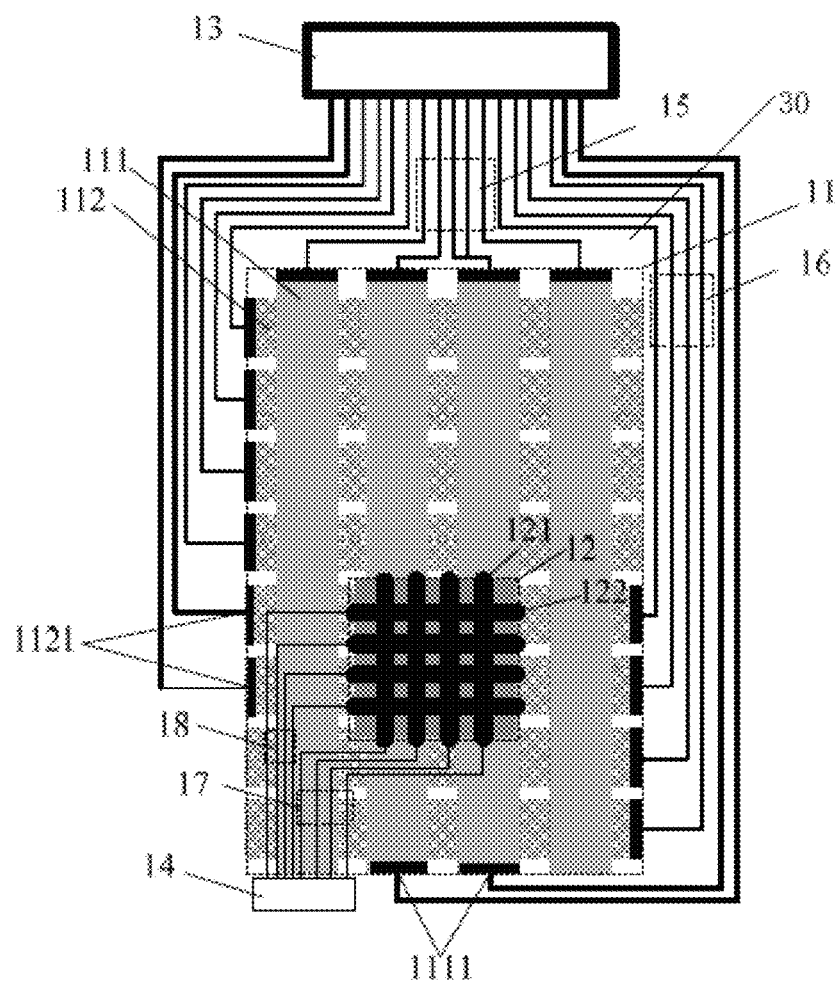
FIG. 1 is a schematic structural view of one embodiment of a touch display panel according to an embodiment of the present application.

Referring to FIG. 1, FIG. 1 is a schematic structural view of an embodiment of a touch display panel provided by the application, the touch display panel includes: a touch film layer 11 and a fingerprint identification film layer 12. An orthographic projection of the fingerprint identification film layer 12 on the touch film layer is located in a preset hollow region of the touch film layer 11; two ends of at least one specific electrode 1111 of the touch film layer 11 are connected to a first driver chip 13 via a signal transmission line, and the at least one specific electrode includes a touch drive electrodes and/or a touch inductive electrodes, cut off by the preset hollow region.

The touch film layer includes a touch drive electrode 111 arranged along a first direction, and a touch inductive electrode 112 arranged along a second direction. The touch drive electrode 111 and the touch inductive electrode 112 are cross-insulated.

Optionally, when the at least one specific electrode includes the touch drive electrode and the touch inductive electrode, as shown in FIG. 1, two ends of the at least one specific electrode in the touch film layer is connected to a first driver chip 13 by the signal transmission line. Specifically, two ends of a first specific electrode 1111 in the touch film layer are connected to the first driver chip 13 via a first signal transmission line 15, and the first specific electrode 1111 is a touch drive electrode which is cut off by the preset hollow region. Two ends of a second specific electrode 1121 in the touch film layer are connected to the first driver chip 13 via a second signal transmission line 16, and the second specific electrode 1121 is a touch inductive electrode which is cut off by the preset hollow region.

Figure 2:
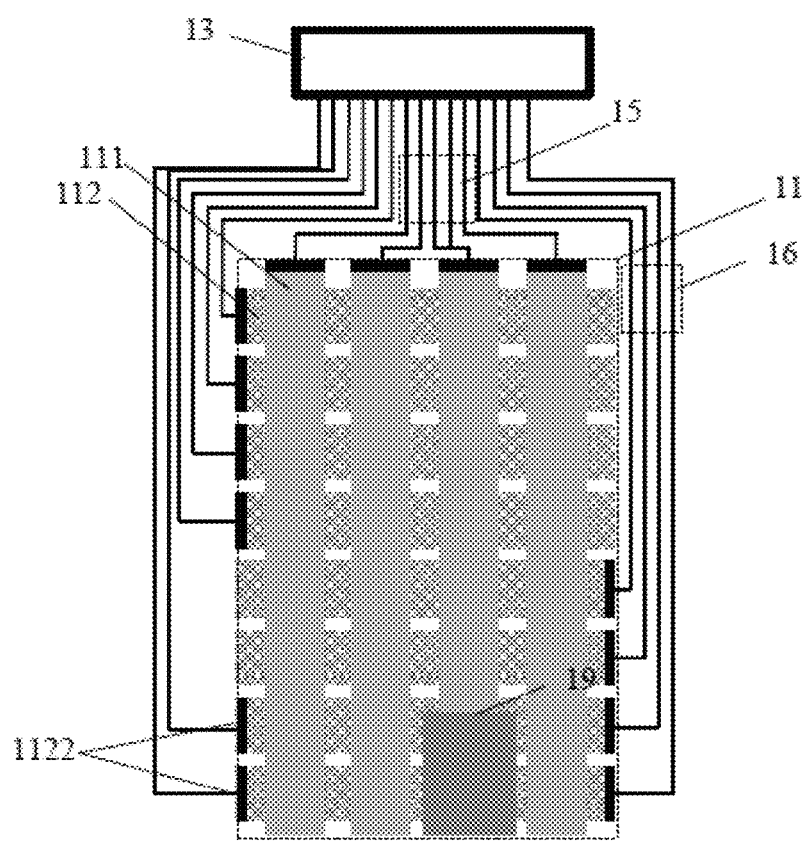
FIG. 2 is a schematic view of a location of a preset hollow region in a touch display panel according to an embodiment of the present application.

Optionally, when the at least one specific electrode includes the touch inductive electrode which is cut off by the preset cutout area, as shown in FIG. 2, the specific electrode cut off by the preset hollow area is the touch inductive electrode 1122 when the preset hollow area is in the positional area indicated by mark 19. The touch drive electrode removed by the preset hollow region indicated by the mark 19 is located at an edge of the touch film layer, and the preset hollow region does not affect the touch drive electrode. Thus two ends of the touch inductive electrode 1122 which are cut off by the preset hollow area are connected to the first driver chip 13 via a signal transmission line, so as to prevent the touch inductive electrode which is cut off by the preset hollow area from being disconnected to the first driver chip 13.

Figure 3:
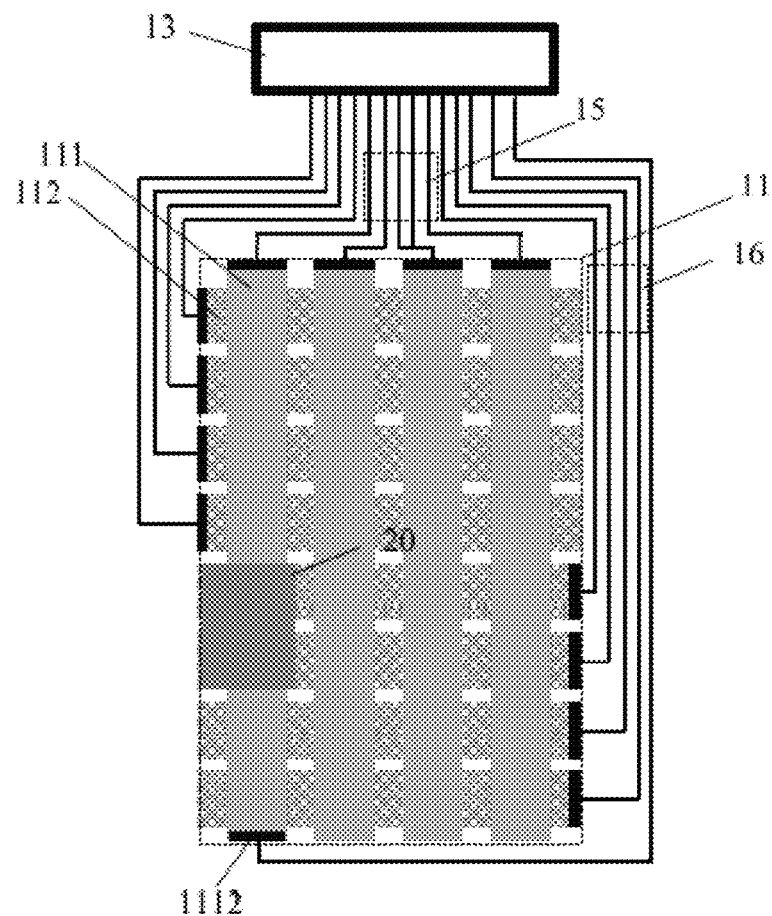
FIG. 3 is a schematic view of another location of a preset hollow region in a touch display panel according to an embodiment of the present application.

Optionally, when the at least one specific electrode includes the touch drive electrode which is cut off by the preset cutout area, as shown in FIG. 3, the specific electrode cut off by the preset hollow area is the touch drive electrode 1112 when the preset hollow area is in the positional area indicated by mark 20. The touch inductive electrode removed by the preset hollow region indicated by the mark 20 is located at an edge of the touch film layer, and the preset hollow region does not affect the touch inductive electrode. Thus, two ends of the touch drive electrode 1112 which are cut off by the preset hollow area are connected to the first driver chip 13 via a signal transmission line, so as to prevent the touch drive electrode which is cut off by the preset hollow area from being disconnected to the first driver chip 13.

As shown in FIG. 1, the fingerprint identification film layer 12 includes a fingerprint drive electrode 121 arranged along a third direction, and a fingerprint inductive electrode 122 arranged along a fourth direction, the fingerprint drive electrode 121 and the fingerprint inductive electrode 122 are cross-insulated. The fingerprint drive electrode 121 is connected to a second driver chip 14 via a third signal transmission line 17, and the fingerprint inductive electrode 122 is connected to the second driver chip 14 via a fourth signal transmission line 18. The first driver chip 13 and the second driver chip 14 may be respectively a driver chip of the touch film layer and a driver chip of the fingerprint identification film layer, that is, the two driver chips are two different driver chips. The structure of the touch display panel can also be simplified to integrate the two driver chip into a package, that is, the first driver chip 13 and the second driver chip 14 can be located in an integrated driver chip.

Optionally, with respect to a positional relationship between the fingerprint identification film layer 12 and the touch film layer 11, when the touch inductive electrode and the touch drive electrode are arranged in the same layer, the fingerprint electrode and the touch film layer may be arranged in different layers or arranged in the same layer; when the touch inductive electrode and the touch drive electrode are arranged in different layers, the fingerprint electrode and one of the touch inductive electrode and the touch drive electrode may be arranged in the same layer, or may be arranged in different layers.

Optionally, in the actual manufacturing process, in order to simplify the process and the manufacturing flow, the embodiment of the application provides a preferred manner, the first direction may be the same as the third direction, and the second direction may be the same as the fourth direction, as shown in FIG. 1. In addition, the first direction and the third direction may also be different, and the second direction and the fourth direction may also be different. For example, the first direction and the third direction may also intersect at an angle of 45°, and the second direction and the fourth direction are may also intersect at an angle of 45°, or other angles are possible, which is not limited in the application.

In addition, referring to FIG. 1, the touch display panel in the embodiment of the application further includes a display film layer 30, wherein a plurality of illuminating sub-pixels are arranged in an array in the display film layer 30. Because the touch film layer 11 and the fingerprint identification film layer are arranged above the display film layer 30, an orthographic projection of the fingerprint drive electrode and the fingerprint inductive electrode of the fingerprint identification film layer 12 in the embodiment of the application on the touch film layer 11 does not overlap with an orthographic projection of the illuminating sub-pixels of the display film layer 30 on the touch film layer 11, in order to avoid shading of the plurality of illuminating sub-pixels in the display film layer 30. Preferably, in order to achieve this technical effect, the material of the fingerprint identification film layer in the embodiment of the application may be a metal material with a width of less than 5 micrometers, or a transparent conductive material may also be selected.

An orthographic projection of the fingerprint drive electrode and the fingerprint inductive electrode of the fingerprint identification film layer on the touch film layer does not overlap with an orthographic projection of the illuminating sub-pixels of the display film layer on the touch film layer. In practical applications, due to a limitation of the process level, the effect of completely non-overlapping may not be achieved. Thus, the following case may occur: the orthographic projection of the fingerprint drive electrode and the fingerprint inductive electrode of the fingerprint identification film layer on the touch film layer partly overlaps with the orthographic projection of the illuminating sub-pixels of the display film layer on the touch film layer. In such a case, in order to avoid shading the illuminating sub-pixels in the display film layer by the fingerprint identification film layer, a transparent conductive material can be selected as the material of the fingerprint identification film layer.

In addition, since the third signal transmission line and the fourth signal transmission line are also located above the display film layer, in order to avoid the shading of the illuminating sub-pixels in the display film layer by the third signal transmission line and the fourth signal transmission line, thereby affecting the display effect, the third signal transmission line and the fourth signal transmission line are located at a gap of adjacent illuminating sub-pixels of the display film layer. In practical applications, the widths of the third signal transmission line and the fourth signal transmission line tend to be as fine as possible, and the width thereof is often less than 3 micrometers in practical applications.

Figure 4:
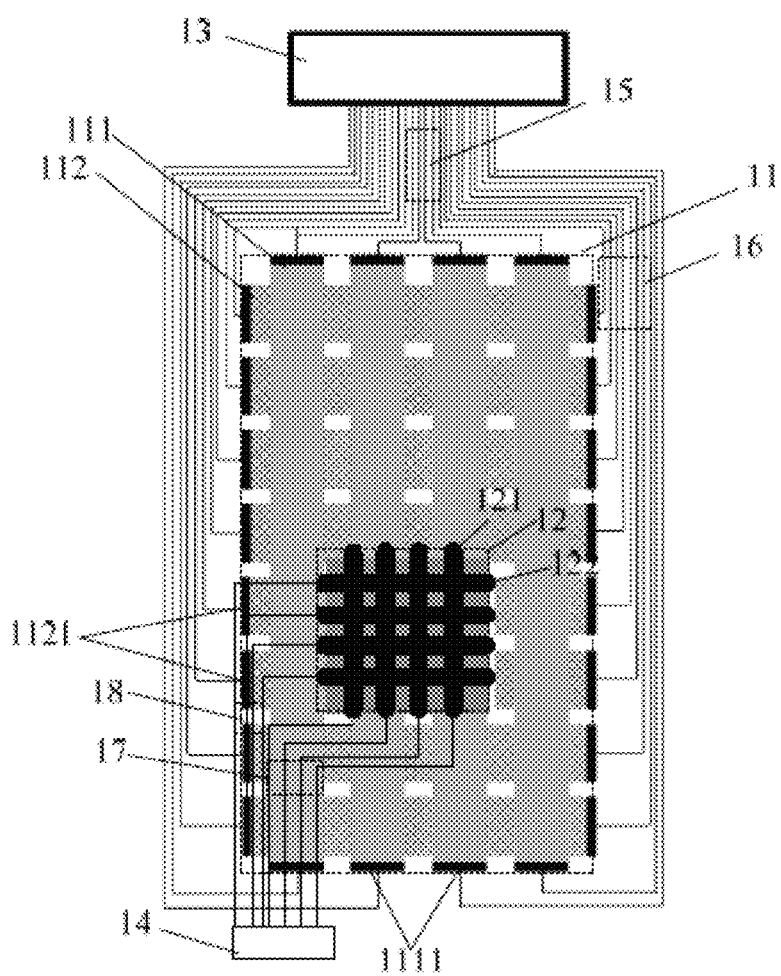
FIG. 4 is a schematic structural view of another embodiment of a touch display panel according to an embodiment of the present application.

The shape of the touch drive electrode and the touch inductive electrode of the touch film layer in the embodiment of the application may be not only a rectangular shape (as shown in FIG. 1 and FIG. 4), but also a diamond shape. The shape of the fingerprint drive electrode and the fingerprint inductive electrode in the fingerprint identification film layer may also be a diamond shape.

Optionally, in the actual manufacturing process, in order to facilitate the manufacturing and simplify the craft, two ends of the touch drive electrode 111, except the first specific electrode, in the touch film layer in the embodiment of the application may also be connected to the first driver chip 13 via the first signal transmission line 15. Two ends of the touch inductive electrode 112, except the second specific electrode, in the touch film layer may also be connected to the first driver chip 13 via the second signal transmission line 16. As shown in FIG. 4, two ends of each of the touch drive electrodes 111 in the touch film layer are connected to the first driver chip 13 via the first signal transmission line 15, and two ends of each of the touch inductive electrodes 112 in the touch film layer are also connected to the first driver chip 13 via the second signal transmission line 16.

In the touch display panel provided by the application, since the preset hollow region is arranged in the touch film layer, and the orthographic projection of the fingerprint identification film layer on the touch film layer is located in the preset hollow region of the touch film layer, thus there is no interference between these two film layers. Furthermore, two ends of at least one specific electrode in the touch film layer are connected to the first driver chip via a signal transmission line, and the at least one specific electrode includes the touch drive electrode and/or the touch inductive electrode, cut off by the preset hollow region, thereby preventing the touch drive electrode and the touch inductive electrode cut off by the preset hollow region from cutting off the connection to the first driver chip.

The above is a touch display panel provided by the application. Based on the touch display panel, the embodiment of the application further provides a touch display device, including the touch display panel as described above.

The touch display device may be, for example, a touch display screen of a smart mobile terminal, but is not limited thereto; those display devices, as long as the orthographic projection of the fingerprint identification film layer on the touch film layer is located in a preset hollow area of the touch film layer, should be within the protection scope of the application.

The above touch display device includes the touch display panel. In addition, the touch display device can be any product or component with a display function, such as a mobile phone, a tablet computer, a television, a display, a notebook computer, a digital photo frame, a navigator, a smart wearable device, and the like. Other indispensable components of the touch display device are understood by a person skilled in the art, and are not described herein, nor should they be construed as an limitation to the application.

What is claimed is:

1. A touch display panel, comprising a touch film layer and a fingerprint identification film layer, an orthographic projection of the fingerprint identification film layer on the touch film layer being located in a preset hollow region of the touch film layer;
   the fingerprint identification film layer comprising a plurality of fingerprint drive electrodes and a plurality of fingerprint inductive electrodes;
   the touch film layer comprising a plurality of specific electrodes, two ends of at least one of the plurality of specific electrodes being connected to a first driver chip via a signal transmission line, and each of the plurality of specific electrodes comprising a touch drive electrode and/or a touch inductive electrode, cut off by the preset hollow region; wherein the plurality of fingerprint drive electrodes are connected to a second driver chip and the plurality of fingerprint inductive electrodes are connected to the second driver chip wherein the first driver chip is located opposite to the second driver chip;
   wherein each of the plurality of specific electrodes comprises a first specific electrode and a second specific electrode, wherein two ends of each of the touch drive electrodes, except the first specific electrode, in the touch film layer are connected to the first driver chip via the first signal transmission line;
   two ends of each of the touch inductive electrodes, except the second specific electrode, in the touch film layer are connected to the first driver chip via the second signal transmission line.

2. The touch display panel of claim 1, wherein when each of the plurality of specific electrode comprises a first specific electrode and a second specific electrode, two ends of at least one of the plurality of specific electrodes in touch film layers being connected to the first driver chip via a signal transmission line, comprises:
   two ends of the first specific electrode in touch film layer are connected to a first driving chip via a first signal transmission line, and the first specific electrode is the touch drive electrode cut off by the preset hollow region;
   two ends of the second specific electrode in touch film layer are connected to the first driving chip via a second signal transmission line, and the second specific electrode is the touch inductive electrode cut off by the preset hollow region.

3. The touch display panel of claim 1, wherein the plurality of fingerprint drive electrodes are arranged along a third direction, and the plurality of fingerprint inductive electrodes arranged along a fourth direction; the plurality of fingerprint drive electrodes and the plurality of fingerprint inductive electrodes are cross-insulated; and
   the plurality of fingerprint drive electrodes are connected to a second driver chip via a third signal transmission line, and the plurality of fingerprint inductive electrodes are connected to the second driver chip via a fourth signal transmission line.

4. The touch display panel of claim 3, wherein, the touch film layer includes a plurality of the touch drive electrodes arranged along a first direction, and a plurality of the touch inductive electrodes arranged along a second direction;
   the first direction is the same as the third direction, and the second direction is the same as the fourth direction.

5. The touch display panel of claim 3, further comprising: a display film layer, wherein a plurality of illuminating sub-pixels are arranged in an array in the display film layer;
   orthographic projections of both the fingerprint drive electrode and the fingerprint inductive electrode of the fingerprint identification film layer on the touch film layer do not overlap with an orthographic projection of the illuminating sub-pixels of the display film layer on the touch film layer.

6. The touch display panel of claim 5, wherein the third signal transmission line and the fourth signal transmission line are located at a gap of adjacent illuminating sub-pixels of the display film layer.

7. The touch display panel of claim 1, wherein a material of the fingerprint identification film layer is a transparent conductive material or a metal material having a width of less than 5 micrometers.

8. A touch display device comprising the touch display panel according to claim 1.

* * * * *